Patented July 12, 1938

2,123,641

UNITED STATES PATENT OFFICE 2,123,641

MINERAL OILS

Peter J. Wiezevich, Elizabeth, N. J., now by judicial change of name Peter John Gaylor, assignor to Standard Oil Development Company, a corporation of Delaware No Drawing. Application December 7, 1933, Serial No. 701,343

9 Claims. (Cl. 87—9)

This invention relates to the addition of high molecular weight polymerized oxygenated compounds as blending agents in hydrocarbons, and more particularly, to a means of increasing the viscosity and improving the viscosity characteristics of lubricating oils.

Various polymerized high molecular weight hydrocarbons have been described which have the property of improving the viscosity characteristics of hydrocarbon oils. It has now been found that other materials, especially oxygenated polymerized compounds such as polyvinyl esters, ketones and ethers, polyanhydrides of organic acids and their derivatives, poly-lactides, poly-amino acids or peptides and their derivatives, polyhydroxy-acids, reaction products of poly-hydroxy compounds with poly-basic acids, Bakelite resins, and the like, or combinations of these, are suitable for this purpose. The linear polymers, i. e. those polymerizing in relatively long chains similar to the type attributed to be present in polyvinyl esters or unvulcanized rubber are the most suitable for this purpose. It is believed that polymerization may be made to proceed in two directions, that is, there may be cyclyzation or ring formation as well as linear chain formation. Often, it is very difficult to obtain linear polymers without simultaneous production of ring type compounds. For the purpose of this invention it is not necessary to employ pure linear polymers, and substantial amounts of products formed by concomitant reactions may be used, although it is preferable to keep the proportion of the latter as low as possible. Carbohydrate compounds, such as cellulose ethers, or esters of polysaccharides, are not employed in this invention. Thickened glycerides are also excluded, since they cannot be considered to be of a linear nature.

Due to the fact that the oxygen present reduces the solubility of these polymers in mineral oils, it is desirable to adjust the ratio of oxygen to carbon, hydrogen, or other constituents in order to maintain the proper solubility in the lubricant. This may be accomplished by selecting the suitable raw materials before polymerization, or by "solubilizing" the polymerized product by alkylation, as described in Serial No. 674,519 filed June 6, 1933 by L. A. Mikeska and S. C. Fulton, by halogenation, cracking, hydrogenation, destructive hydrogenation, condensation, or by other similar processes or combinations of such processes. For instance, by hydrogenation it is possible, in cases where the polymerization does not proceed through an oxygen atom, to eliminate practically all of the oxygen, so that the residual amount may be considered an impurity, or only a fraction of the oxygen may be removed so as to make the polymer soluble in the desired oil. When polymerization proceeds through an oxygen atom so that the oxygen atom is present in the chain, it is desirable to avoid disrupting the molecule by its removal, although a small amount of such depolymerization is often effective in producing a suitable blending agent. Generally, the naphthenic and aromatic types of oils, such as those from Coastal and Mid-Continent crudes, are better solvents for these polymers than the more paraffinic compounds, and hence they will tolerate thickeners having higher percentages of oxygen. However, it is preferred to keep the oxygen content of the polymers below 40%, often between 10–20%, and the desired form of the oxygen is in the form of the keto, acid, ester, or ether groupings or combinations of these. The hydroxy radical is to be avoided as much as possible, being kept preferably below 10% of the weight of the polymer. Other groups or atoms such as halide, amino, sulphur, nitrogen, and the like may be present, provided they do not impair the solubility of the thickener to too large an extent.

Specific compounds and derivatives thereof which may be employed as thickening agents for these purposes are poly-vinyl propionate, poly-vinyl palmitate, poly-oxymethylene derivatives, polymers of olefine oxides, polymerized acrolein, poly-dibenzylidene acetone, polyhydroxy alcohol-polybasic acid and other similar resins, poly-ricinoleic acid, polymerized hydroxy stearic acid, butyl and other esters of poly-ricinoleic acid, polysebacic acid anhydride, lauryl ester of poly-sebacic acid anhydride, benzyl ester of polymerized acrylic acid, solubilized silk, ethylene succinate, hexa-methylene succinate, ethylene adipate, decamethylene adipate, condensation product of cetyl glycol with sebacic acid anhydride, poly-vinyl hexyl ether, condensation products of poly-vinyl alcohol with cyclic ketones, condensation products of polychlor compounds, as polychlor hydrocarbons, with metallic salts of polyacids, metallic alcoholates of poly-hydroxy alcohols, and the like, vinyl esters polymerized with thickened vegetabel oils, ethylene sebacate, polymerized methyl hexyl ketone, poly-lactides of hydroxy acids obtained by the oxidation of mineral oils and waxes with or without preliminary cracking, and the like. These are only a few of a large number of products which have been found suitable. Usually, the addition of 0.1 to 0.5 or to 10% of the thickener is sufficient for lubricating oils, raising the viscosity from S. A. E. 10 to S. A. E. 20 or 30, or 40 or even higher, depending upon the molecular weight and type of thickener employed. Where grease-like products are to be prepared, concentrations as high as 20-30% or higher may be used.

In the case of the acid, lactide, or ester type of polymers, some free acid is often liberated serving as an oiliness improver, and this property is of especial value in the preparation of "breaking-in" oils, gear lubricants, and the like.

The polymers prepared according to this invention are introduced into the oil by stirring them vigorously with the mineral oil heated to 50-150° C. or by adding a solution of the polymer in a light solvent such as acetone, naphtha, carbon tetrachloride, and the like, and evaporating off the light solvent. The mineral oils employed as bases may be ordinary fractions of a crude, destructively hydrogenated, Pennsylvania, Coastal, Mid-Continent or blends of these or other commercial lubricating stocks such as synthetic oils similar to those prepared by treating olefins with aluminum chloride. Refined oils such as white oils or partially refined stocks may also be treated in this manner. Vegetable, animal, or fish oils can also be thickened by such polymers. Addition agents such as pour inhibitors as those prepared by the condensation of aromatics with chlorinated wax, oxidation inhibitors as alpha naphthol, thio-beta-naphthol, polymerization inhibitors, dyes, gum solvents, sludge dispersing agents, high boiling esters, and the like, metallic soaps as lead oleate, cobalt naphthenate and similar compounds, also sulphur compounds, etc., may also be added. It is often advantageous to add to the thickened oil a high boiling solvent (preferably one having a boiling point above 200° C.) having a high solvent action for the thickener, in amounts of 1 to 20% or more of the blended oil. The thickener may be first dissolved in such a solvent prior to the addition of the oil.

The following examples serve to illustrate some of the applications of the process:

Example 1

The compounds obtained by low temperature oxidation of wax were distilled under vacuum to a temperature near the cracking range in order to obtain appreciable polymerization. The residual semi-solid product so polymerized was found to be rich in linear polylactides, polyesters, and polyacids, and had the following properties: Acid number = 36; saponification number=102.5. Analysis: Carbon 78.4%, hydrogen 11.4%, oxygen 10.2%. A blend containing 10% of this material in a Coastal oil having a viscosity of 360 seconds Saybolt at 100° F., 50 at 210, and a viscosity index of 38 showed the following inspection data:

Vis./100° F_____seconds Saybolt Universal___ 482
Vis./210° F_____do_____ 56
Viscosity index_____do_____ 55

Example 2

A sample of 12-hydroxystearic acid was converted to the polylactide by heating at 200° C. for a period of 50 hours. The material (containing about 12% oxygen) had the following viscosity characteristics:

Vis./100° F_____ 5000
Vis./210° F_____ 420
Viscosity index_____ 124
Acid No _____ 34.5
Approximate average molecular weight___ 1600

This product was blended with the Coastal Oil mentioned in Example 1, and a 10% solution in the mineral oil showed the following inspection:

Vis./100° F_____ 542
Vis./210° F_____ 61.4
Viscosity index_____ 77

Example 3

Another sample of 12-hydroxystearic acid was heated for about 60 hours at 200° C., a stream of carbon dioxide being blown through the material to avoid excessive oxidation and to aid in driving off the water formed in the reaction. At the end of the period, a semi-solid linear polylactide containing product was obtained having an acid number of 10 and an approximate average molecular weight of 5500. A 10% blend of this material in the Coastal oil described in Example 1 gave the following viscosity characteristics:

Vis./100° F_____ 1116
Vis./210° F_____ 99.6
Viscosity index_____ 111

Although polyvinyl acetate is soluble only to a limited extent in Coastal oils, in one case raising the viscosity at 100° F. from 360 to 365, the polyesters of the higher fatty acids and naphthenic acids, as well as the higher molecular weight ethers are capable of producing marked increases in viscosity, when used even in amounts of 1 to 5 or 10%.

The most desirable materials for enhancing the properties of lubricating oils are the polymers which are plastic in nature, that is solid or semi-solid at room temperatures. In a number of cases solid thickeners are prepared which are recovered in liquid form due to the presence of high boiling solvents, but upon removal of the latter by selective extraction and similar methods, a solid or semi-solid thickener is generally obtained.

The average molecular weights of the desired polymers will vary with the type of material used. Generally, the range of 700-10,000 would cover the products used to the greatest extent, although polymers of higher or lower molecular weights are not excluded.

The products also may be used as blending agents in gasoline and other fuels, naphthas, Diesel oils, solvents, residua, and the like. Due to their ability to improve the viscosity characteristics, they are suitable as compounding ingredients in greases, gear lubricants, and synthetic lubricants, as for example the products obtained by condensing chlorinated wax with aromatics, or those produced by polymerizing olefins in the presence of zinc chloride.

The polymers or solutions of these products may be modified mechanically by cold or hot working, forcing through fine orifices under high pressure, milling, grinding by gears, and the like, or submitted to action of heat to effect additional polymerization or depolymerization, or blended with other thickening agents or resins.

This invention is not restricted by the above examples or by any mechanism of the thickening action produced, but only by the following claims in which it is my intention to cover the process as broadly as the prior art permits.

I claim:

1. A lubricant thickened with a linear soluble polymer ester of a polybasic organic acid and a polyhydroxy alcohol, said polymer having not over 40% oxygen.

2. A lubricant according to claim 1 in which the polymer has an average molecular weight of 700 to 10,000.

3. A lubricant according to claim 1 in which the polymer has an average molecular weight of 1,000 to 6,000.

4. A lubricant according to claim 1 in which the polymer has an average molecular weight of 4,000 to 10,000.

5. A lubricant according to claim 1 in which the proportion of the polymer is up to 0.1%.

6. A lubricant comprising a mineral lubricating oil thickened with a small proportion of a soluble polymer having not over 40% oxygen and comprising an ester of a polybasic organic acid and a polyhydroxy alcohol.

7. A lubricant comprising a mineral lubricating oil thickened with .5 to 10% of a soluble polymer ester of a dibasic organic acid and a glycol.

8. A composition comprising a lubricating oil blended with 0.1 to 30% of soluble oxygenated polymer esters of a polycarboxylic organic acid and polyhydroxy organic compound.

9. A lubricant containing a small proportion of a soluble linear polymer ester of a high molecular weight dibasic organic acid and a high molecular weight glycol, said polymer having a molecular weight of over 4,000 and not having over 40% oxygen.

PETER J. WIEZEVICH.